(12) United States Patent
Yokoi et al.

(10) Patent No.: US 9,477,426 B2
(45) Date of Patent: Oct. 25, 2016

(54) STORAGE SYSTEM AND STORAGE METHOD

(71) Applicant: Hitachi, Ltd., Tokyo (JP)

(72) Inventors: Kazuhito Yokoi, Tokyo (JP); Masanori Takata, Tokyo (JP); Masakuni Agetsuma, Tokyo (JP); Shoji Kodama, Tokyo (JP); Masaaki Iwasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 14/380,859

(22) PCT Filed: Oct. 1, 2013

(86) PCT No.: PCT/JP2013/076704
§ 371 (c)(1),
(2) Date: Aug. 25, 2014

(87) PCT Pub. No.: WO2015/049719
PCT Pub. Date: Apr. 9, 2015

(65) Prior Publication Data
US 2016/0246545 A1 Aug. 25, 2016

(51) Int. Cl.
*G06F 3/06* (2006.01)
(52) U.S. Cl.
CPC .............. *G06F 3/0659* (2013.01); *G06F 3/067* (2013.01); *G06F 3/0611* (2013.01); *G06F 3/0643* (2013.01); *G06F 3/0683* (2013.01)
(58) Field of Classification Search
CPC .. G06F 3/0659; G06F 3/0611; G06F 3/0643; G06F 3/0683
USPC ............... 711/154, 158, 165, 168, 171, 172; 707/616, 641; 709/231, 234, 235; 710/33, 36
See application file for complete search history.

(56) References Cited

U.S. PATENT DOCUMENTS

| 7,089,286 B1* | 8/2006 | Malik | H04L 51/066 707/999.01 |
| 7,739,614 B1* | 6/2010 | Hackworth | G06F 11/3495 715/771 |

(Continued)

FOREIGN PATENT DOCUMENTS

| JP | 07-239808 A | 9/1995 |
| JP | 10-240603 A | 9/1998 |

(Continued)

OTHER PUBLICATIONS

Ashita Yara & Kei Ozaki, "Improvement of Application Response Time by WAN Accelerator", UNISYS Technology Review, Nov. 2009, pp. 1-14. Abstract only.

*Primary Examiner* — Stephen Elmore
(74) *Attorney, Agent, or Firm* — Volpe and Koenig, P.C.

(57) ABSTRACT

A first storage apparatus determines whether to execute bulk requesting of causing a second storage apparatus to group a plurality of actual files corresponding to a plurality of stub files into one bulk data and transmit the bulk data. When determining to execute the bulk requesting in the determination, the first storage apparatus transmits a bulk request to the second storage apparatus. The second storage apparatus that has received the bulk request groups a plurality of actual files into one bulk data based on the bulk request, and transmits the bulk request to the first storage apparatus. The first storage apparatus that has received the bulk data extracts the plurality of actual files corresponding to a plurality of stub files, from the bulk data.

9 Claims, 11 Drawing Sheets

(56) References Cited

U.S. PATENT DOCUMENTS

| | | | | |
|---|---|---|---|---|
| 8,065,305 B2* | 11/2011 | Moriwake | G06F 3/0625 | 707/737 |
| 8,190,677 B2* | 5/2012 | Myers | H04N 21/234327 | 709/203 |
| 8,301,696 B2* | 10/2012 | Myers | H04N 21/234327 | 709/203 |
| 8,578,112 B2* | 11/2013 | Tashiro | G06F 3/0608 | 711/162 |
| 8,725,675 B2* | 5/2014 | Moriwake | G06F 3/0625 | 707/602 |
| 8,862,812 B2* | 10/2014 | Mimatsu | G06F 3/0617 | 709/224 |
| 8,953,611 B2* | 2/2015 | Pecen | H04L 47/10 | 370/229 |
| 8,972,358 B2* | 3/2015 | Yamakawa | G06F 17/30179 | 382/218 |
| 9,053,057 B2* | 6/2015 | Solihin | G06F 12/082 | |
| 9,201,888 B2* | 12/2015 | Suzuki | G06F 17/3007 | |
| 2007/0192561 A1 | 8/2007 | Satoyama et al. | | |
| 2012/0016838 A1 | 1/2012 | Arai et al. | | |
| 2013/0080715 A1* | 3/2013 | Mori | G06F 3/061 | 711/154 |
| 2013/0218916 A1* | 8/2013 | Suzuki | G06F 17/3007 | 707/755 |
| 2013/0218934 A1* | 8/2013 | Lin | G06F 17/30194 | 707/828 |

FOREIGN PATENT DOCUMENTS

| | | |
|---|---|---|
| JP | 2003-084921 A | 3/2003 |
| JP | 2007-213466 A | 8/2007 |
| WO | 2011/148496 A1 | 12/2011 |

* cited by examiner

STORAGE SYSTEM AND STORAGE METHOD

TECHNICAL FIELD

The present invention relates to a data storage technique.

BACKGROUND ART

A technique is known in which a file storage migrates a file, written by a host through a communication network, to a cloud storage, and restores the file from the cloud storage in response to reading by the host.

A WAN (Wide Area Network) acceleration technology is used between communication networks, because file transmission through the communication network might take time. The WAN acceleration technology improves the throughput and the response performance of WAN communications. For example, a technique of shortening a response time to the host, when the file storage and the cloud storage are coupled with each other through a CIFS (Common Internet File System), is described in NPL 1. This is achieved by the file storage reading a file from the cloud storage beforehand.

CITATION LIST

Non Patent Literature

NPL 1

"Improvement of Application Response Time by WAN Accelerator", UNISYS TECHNOLOGY REVIEW (2009)

SUMMARY OF INVENTION

Technical Problem

When a file is restored from a second storage apparatus such as a cloud storage to a first storage apparatus such as a file storage, preferably, the time required for the restoring is as short as possible.

An object of the present invention is to reduce the time required for restoring a file from the second storage apparatus to the first storage apparatus.

Solution to Problem

A storage system according to an embodiment of the present invention includes: a first storage apparatus; and a second storage apparatus coupled to the first storage apparatus.

The first storage apparatus is configured to
  execute bulk request determination of determining whether to execute bulk requesting of causing the second storage apparatus to group a plurality of actual files corresponding to a plurality of stub files into one bulk data and transmit the bulk data,
  transmit a bulk request to the second storage apparatus when determining to execute the bulk requesting in the bulk request determination, and
  extract the plurality of actual files corresponding to the plurality of stub files, from the bulk data received from the second storage apparatus, and
the second storage apparatus is configured to group the plurality of actual files corresponding to the plurality of stub files into the one bulk data and transmit the bulk data to the first storage apparatus based on the bulk request, when the bulk request is received from the first storage apparatus.

Advantageous Effect of Invention

According to the present invention, the time required for restoring a file from a second storage apparatus to a first storage apparatus can be reduced.

DESCRIPTION OF EMBODIMENTS

Figure 1:
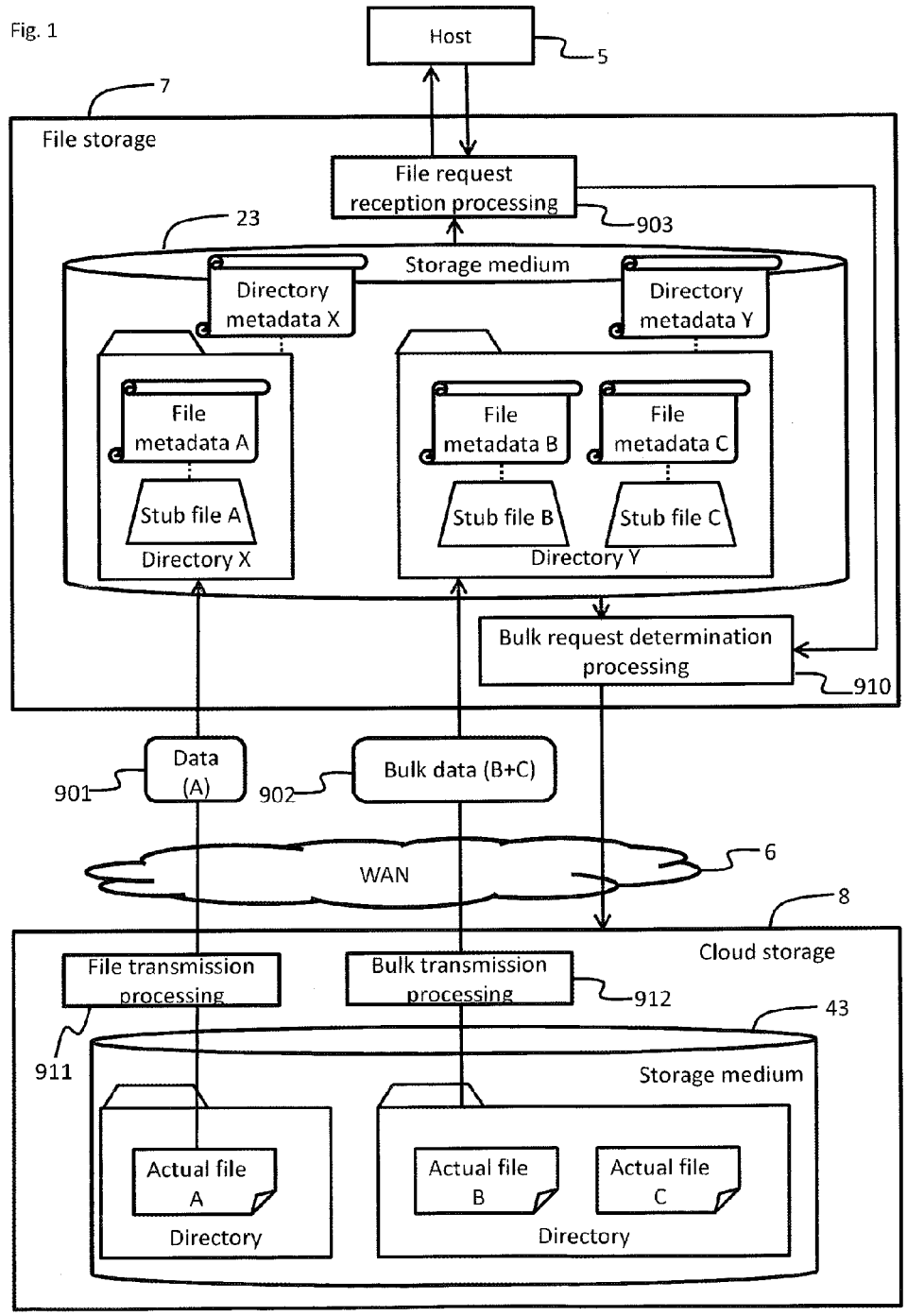
FIG. 1 is a block diagram showing an overview of processing of a storage system.

Embodiments are described below with reference to the drawings. In the description below, information is sometimes described with an expression such as "aaa table". The information may be referred to with expressions other than a data structure as represented by a table. Thus, "aaa table" and the like are sometimes referred to as "aaa information" to show that the information is not limited to the data structure. The identification information expressed as "number" and "name" is employed to describe the content of each piece of information. Alternatively, other types of identification information may be used. In the following description, the description is sometimes given with "program" as a subject. The program is executed by a processor to execute a predetermined processing by using a memory and a communication port (network I/F). Thus, the description may be given with the processor as the subject. Furthermore, the processing, disclosed with the program as a subject, may be processing executed by a computer such as a monitoring system and the like. A part or all of the programs may be implemented by dedicated hardware. Various programs may be installed in computers through a program distribution server or a storage medium that can be read by computers. In the following description, with regard to reference numerals for a plurality of components of the same type, main numbers identical to one another and different letters are used in combination. In some cases, the components of the same type are described only with the main number of the reference numeral, when the components are described while not being distinguished from each other. The components of the same type are described with reference numerals, when the components are described while being distinguished from each other.

Example 1

FIG. 1 is a block diagram showing an overview of processing of a storage system.

A storage system according to Example 1 includes a file storage 7, as an example of a first storage apparatus, and a cloud storage 8, as an example of a second storage apparatus. In the present embodiment, "file storage" is an apparatus that provides a file system to a host 5. A "cloud storage" is an apparatus in which actual data pieces of files managed by the file storage 7 are aggregated. Specifically, the file storage 7 copies the data (hereinafter, referred to as "actual data") of a file stored in the file system to the cloud storage 8 (replication). Thus, the actual data pieces of the files are aggregated in the cloud storage 8. The file storage 7 deletes the copied actual data based on a predetermined policy (stubbing). For example, the file storage 7 deletes the actual data of one of the copied files that has not been updated (changed) and with an old last access time, in accordance with the free space in the file system. Thus, the free space in the file storage 7 can be increased. When the host 5 accesses a stubbed file (hereinafter, referred to as "stub file"), the file storage 7 reads the actual data of the accessed stub file from the cloud storage 8, and transmits the actual data to the host 5. Thus, in the storage system, the host 5 can access data without concerning about the stored location of the actual data of the file.

The file storage 7 includes a storage medium 23 such as an HDD (Hard Disk Drive) or a flash memory, and stores a plurality of directories and files in the storage medium 23. Similarly, the cloud storage 8 includes a storage medium 43, and stores a plurality of directories and files in the storage medium 43. The file storage 7 and the cloud storage 8 can transmit and receive data to and from each other through a WAN 6, which is a communication network. The WAN 6 is formed of, for example, an Internet network, a dedicated line, or a combination thereof.

The files stored in the file storage 7 include an actual file with actual data and a stub file without actual data. The actual data of the stub file is in the cloud storage 8. The stub file includes information on a storage destination of the actual data, metadata (file metadata 420) related to the actual data, and the like.

When the file storage 7 receives a file acquisition request from the host 5, which is a computer, and a target file of the file acquisition request is the actual file, the file storage 7 returns the actual data corresponding to the actual file to the host 5. When the target file is a stub file 201, the file storage 7 acquires the actual data, corresponding to the stub file 201, from the cloud storage 8, and returns the actual data to the host 5.

When receiving the file acquisition request from the host 5 through file request reception processing 903, the file storage 7 executes bulk request determination processing 910. In the bulk request determination processing 910, the file storage 7 determines whether to execute "file requesting" or "bulk requesting" to request the actual data, corresponding to the stub file, from the cloud storage 8. The bulk request determination processing 901 may be executed only when the target file of the file acquisition request is the stub file, and may not be executed when the target file is the actual file.

Here, "file requesting" is the processing of transmitting data on a file basis. Here, "bulk requesting" is the processing of transmitting a plurality of actual data pieces grouped into one bulk data. The amount of communications can be reduced, from a case where the actual data pieces are transmitted on a file basis, when a plurality of small-size data pieces are grouped into one bulk data to be transmitted. This is because when the actual data pieces are transmitted on a file basis, data such as a header is added to each file to be transmitted, thereby increasing a data amount. The data amount increases especially when a data size is small.

The bulk request determination processing 910 is executed based on information written in the directory metadata and file metadata related to the stub file as an acquisition target. For example, a case where the file storage 7 receives a file acquisition request for a stub file A from the host 5 is considered. Here, the file storage 7 refers to directory metadata X of a directory X storing the stub file A, and determines that there is no stub file other than the stub file A (that is, there is only one stub file as the acquisition target). Here, the file storage 7 transmits "file request" for the actual file A corresponding to the stub file A, to the cloud storage 8. The cloud storage 8 that has received the request transmits actual data 901 of the actual file A to the file storage 7, through file transmission processing 911. The file storage 7 that has received the actual data 901 materializes the stub file A (generates the actual file A).

For example, a case where the file storage 7 receives the file acquisition request for the stub file B from the host 5 is considered. Here, the file storage 7 refers to the directory metadata Y of the directory Y storing the stub file B, and determines that a stub file C other than the stub file B exists (that is, there are two stub files as the acquisition target). The file storage 7 further refers to file metadata pieces B and C of the respective stub files B and C, and determines that the file size of each of the stub files B and C is not larger than a threshold value. Then, the file storage 7 transmits "bulk request" for the actual files B and C, respectively corresponding to the stub files B and C, to the cloud storage 8. When receiving the request, the cloud storage 8 generates one bulk data 902 by grouping the actual files B and C, and transmits the bulk data 902 to the file storage 7, through bulk transmission processing 912. When receiving the bulk data 902, the file storage 7 extracts the actual files B and C from the bulk data 901 and materializes the stub files B and C (constructs the actual files B and C). Thus, the amount of communications can be reduced from a case where the actual files B and C are transmitted on a single file basis.

The host 5 might access the stub file B, and then access the stub file C in the same directory. For example, after accessing an HTML (Hyper Text Markup Language) file, a program such as an Internet browser on the host 5 is likely to access an image file, a style sheet file, a Java Script (registered trademark) file, or the like required for displaying an HTML page, in the same directory.

Figure 2:
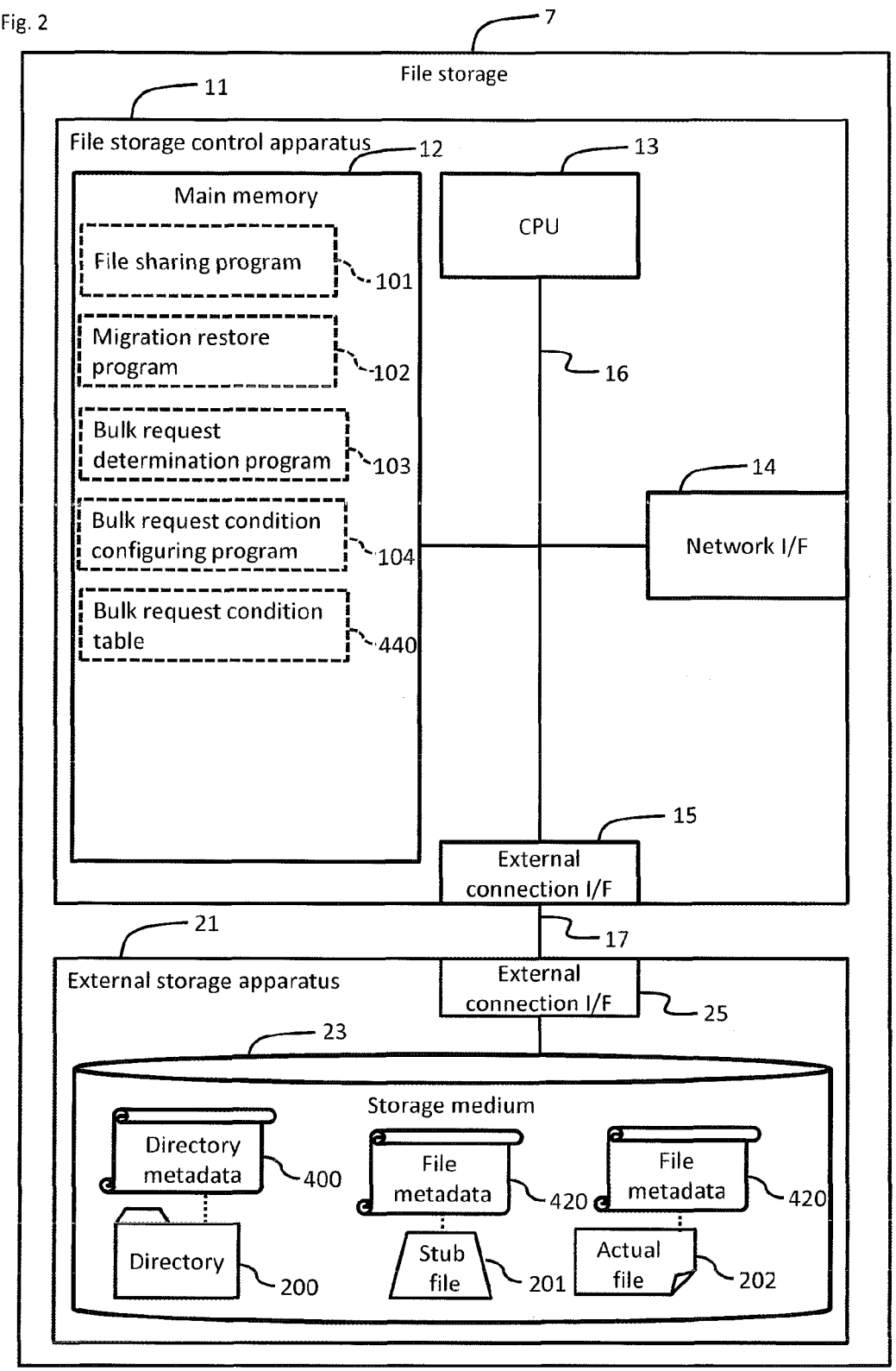
FIG. 2 is a block diagram showing an example of hardware and functions of a file storage.

FIG. 2 is a block diagram showing an example of hardware and functions of the file storage 7.

The file storage 7 includes a file storage control apparatus 11 and an external storage apparatus 21. The components 11 and 21 are coupled to each other through a predetermined cable 17 allowing data communications. The file storage control apparatus 11 includes, as hardware, a CPU 13, a main memory 12, a network I/F 14, and an external connection I/F 15. The components 12 to 15 are coupled to each other through a bus 16 allowing bidirectional communications.

The CPU 13 executes a computer program (hereinafter, referred to as "program"). The CPU 13 executes the program to implement various functions of the file storage 7. The main memory 12 stores the program, data, and the like. The main memory 12 includes, for example, DRAM (Dynamic Random Access Memory) and the like. The CPU 13, the network I/F 14, and the external connection I/F 15 may access the program and the data stored in the main memory 12. The network I/F 14 is an I/F for coupling the file storage control apparatus 11 to the WAN. The external connection I/F 15 is an I/F for coupling the file storage control apparatus 11 with the external storage apparatus 21.

The external storage apparatus 21 includes an external connection I/F 25 and a storage medium 23. The external connection I/F 25 is an I/F for coupling the external storage apparatus 21 with the file storage control apparatus 11.

The storage medium 23 stores various types of data such as a directory 200, a stub file 201, an actual file 202, in accordance with a file system (for example, EXT 3, NTFS, and the like). The directory 200 is associated with directory metadata 400, in which information related to the directory is written. The stub file 201 and the actual file 202 are associated with file metadata 420, in which information related to the file is written. The stub file 201 includes information related to a storage destination of an actual file corresponding to the stub file 201. Examples of information written in the directory metadata 400 and the file metadata 420 are described later.

The file storage control apparatus 11 includes, as functions, a file sharing program 101, a migration/restore program 102, a bulk request determination program 103, a bulk request condition configuring program 104, and a bulk request condition table 440. The programs are read onto the main memory 12 and executed by the CPU 13.

The file sharing program 101 is a program allowing the host 5 to access files in the file system. The file sharing program 101 implements a file sharing system conforming to CIFS, NFS (Network File System) or the like, for example.

The migration/restore program 102 is a program that executes stubbing by copying the actual data of a file in the file storage 7 to the cloud storage 8 and deleting the file (migration). The program further executes data materializing by restoring the actual data corresponding to the stub file 201 in the file storage 7, from the cloud storage 8. The materializing may be executed when the host 5 accesses the stub file, or may be executed for a stub file that is likely to be subsequently accessed when the host 5 accesses a certain file. The stubbing may be executed in accordance with a predetermined policy. For example, the file storage 7 stubs an actual data in the copied files that has not been updated (changed) and that has not been accessed for a long time, when the free space in the file system of the storage medium 23 drops to or below a predetermined threshold value.

The bulk request determination program 103 is a program that determines whether to execute the bulk requesting. The bulk request determination program 103 determines whether to execute the bulk requesting for the stub file 201 based on the bulk request condition table 440 described later. The bulk request determination program 103 determine the stub file 201 to be the target of the bulk request.

Under a condition (A) that a plurality of stub files 201 not less than a first threshold value exist in a directory storing a target file as a target of the file acquisition request from the host 5, the bulk request determination program 103 may determine the stub files 201 in the directory to be the target of the bulk requesting.

Under a condition (B) that an average size of a plurality of actual files, corresponding to a plurality of stub files 201 in a directory storing a target file as a target of the file acquisition request from the host 5, is not larger than a second threshold value, the bulk request determination program 103 may determine the stub files 201 in the directory to be the target of the bulk requesting.

The bulk request determination program 103 may determine the stub files 201 in the directory to be the target of the bulk requesting when the conditions (A) and (B) are both satisfied.

The bulk request determination program 103 may set only the first tier, in the directory storing the target file as the target of the file acquisition request from the host 5, as the target of the determinations for the conditions (A) and (B). Alternatively, the bulk request determination program 103 may also set the subdirectory or lower tiers as the target of the determinations.

When determining to execute the bulk requesting, the bulk request determination program 103 generates the bulk request, and transmits the bulk request to the cloud storage 8. For example, a plurality of file names of the request targets are written in the bulk request.

When determining to execute the normal file request, the bulk request determination program 103 generates the file request, and transmits the file request to the cloud storage 8. For example, one file name of the request target is written in the file request.

Figure 6:
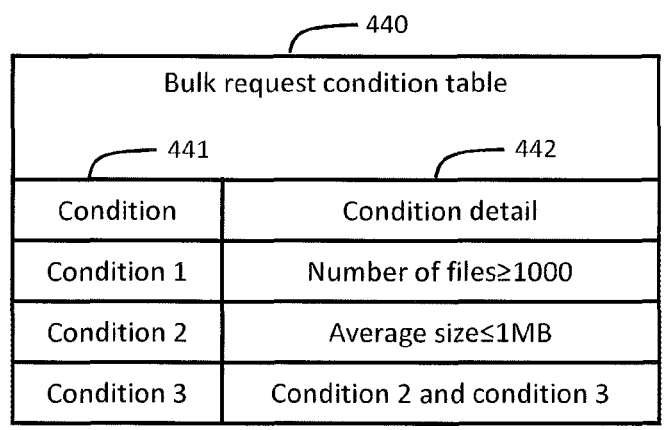
FIG. 6 shows an example of a bulk request condition table.

The bulk request condition configuring program 104 is a program that, for example, registers, edits, or deletes conditions in the bulk request condition table 440 (see FIG. 6). The bulk request condition configuring program 104, for example, generates a bulk request condition configuring screen to be described next, and causes a condition, which is input through the screen, to be reflected on the bulk request condition table 440.

Figure 3:
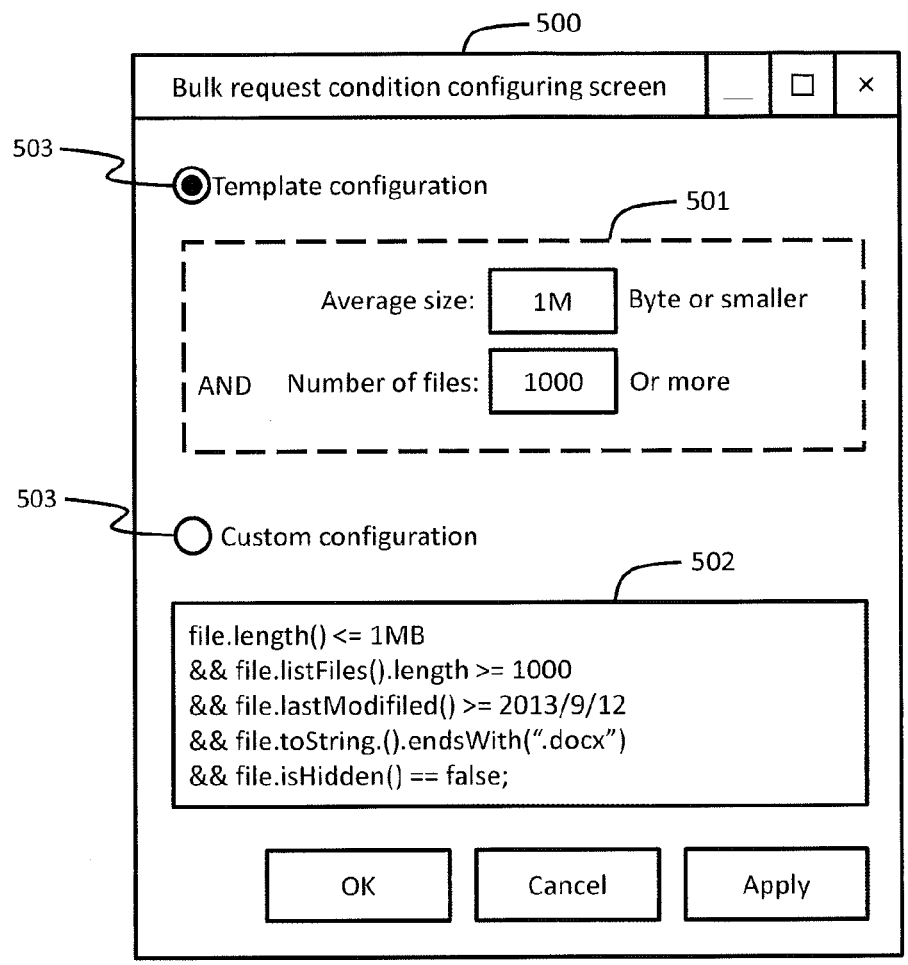
FIG. 3 is an example of a bulk request condition configuring screen.

FIG. 3 is an example of the bulk request condition configuring screen.

A bulk request condition configuring screen 500 is a screen for setting a condition used for bulk request determination. The bulk request condition configuring screen 500 includes a template configuration area 501, a custom configuration area 502, and buttons 503 for selecting any one of the areas.

Conditions that are set quite often are displayed on the template configuration area 501 in advance. A user can set the conditions simply by inputting (changing) a value in the template configuration area 501. For example, the template configuration area 501 shown in FIG. 3 includes input areas for an average size and the number of files. The user can register the condition 'bulk requesting is executed when the average size is "1 MB" or smaller, and the number of the files is "1000" or larger' in the bulk request condition table 440, simply by inputting the values in the input areas. Thus, the user can easily set the bulk request condition.

Any conditions can be set in the custom configuration area 502. For example, a condition is set in the custom configuration area 502 with a program language (or a language similar thereto). The conditions shown in the custom configuration area 502 shown in FIG. 3 is "(file size)≤1 MB) AND (the number of files≥1000) AND (file final change date≥12 Sep. 2013) AND (extension is "docx")

AND (file that is not a hidden file)" in this order from top to bottom. Thus, the user can set various bulk request conditions.

Figure 4:
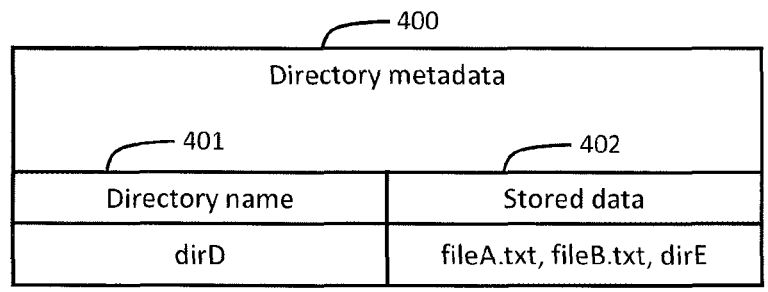
FIG. 4 is an example of information written in directory metadata.

FIG. 4 is an example of information written in the directory metadata 400.

At least one directory metadata 400 is associated with the directory 200. The directory metadata 400 includes a directory name 401 and a stored data 402, as fields.

The directory name 401 stores the name of the subject directory 200. The stored data 402 stores the directory name and the file names, of the directory 200 and files 201 and 202, in the subject directory 200. The various programs refer to the directory metadata 400, and thus can recognize what kind of the directory 200 and the files 201 and 202 are in the directory 200.

Figure 5:
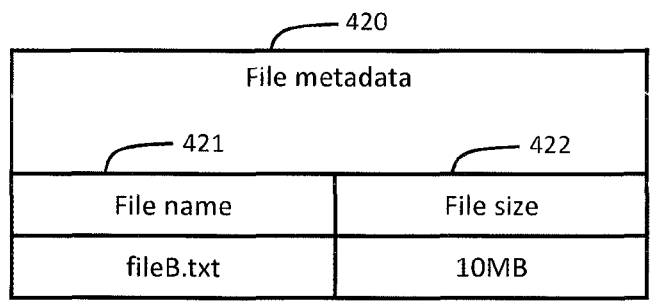
FIG. 5 is an example of information written in file metadata.

FIG. 5 is an example of information written in the file metadata 420.

At least one file metadata 420 is associated with the files 201 and 202. The file metadata 420 includes a file name 421 and a file size 422, as fields.

The file name 421 stores the name of the file 201, 202 corresponding to the file metadata 420. The file size 422 stores the size of the actual data of the file 201, 202 corresponding to the file metadata 420. The file metadata 420 corresponding to the stub file 201 may include "acquisition destination of actual file" as a field. An URL (Uniform Resource Locator) of the acquisition destination of the actual file corresponding to the stub file 201 may be stored in "acquisition destination of actual file". The various programs refer to the file metadata 420, and thus can recognize the size of the actual data of the subject file and the like.

FIG. 6 shows an example of the bulk request condition table 440.

The bulk request condition table 440 includes at least one or two conditions for determining whether to execute the bulk requesting. For example, three conditions of "conditions 1 to 3" are set in the bulk request condition table 440 shown in FIG. 6.

The condition of executing the bulk requesting when "the number of files≥1000" AND "average size≤1 MB" are satisfied, is registered in the bulk request condition table 440 shown in FIG. 6. Here, the bulk request determination program 103 specifies that the stub file 201 is the request target. The bulk request determination program 103 determines to execute the bulk requesting when the number of stub files 201 is not less than 1000 (condition 1), and (condition 3) the average size of the actual data pieces corresponding to the stub files 201 is not larger than 1 MB (condition 2). A plurality of conditions may be linked not only by "AND" but also by "OR" or the like.

For example, the following conditions may be registered in the bulk request condition table 440.

The bulk requesting is executed for a group of transfer target files in a predetermined directory tier or higher.

The bulk requesting is executed for a group of request target files corresponding to a designated access permission.

The bulk requesting is executed for a group of request target files with the generated date, the final access date, the final correction date, and/or the final state changed date at or later (earlier) than a designated date.

The bulk requesting is executed for a group of request target files with the access time not less (or not more) than designated times.

The bulk requesting is executed for a group of request target files with the file creator name matching a designated name.

The bulk request is executed for a group of request target files with an extension (or a content type) matching the designated extension.

When the importance level of a file is registered in a file extended attribute and the like, the bulk request is executed for a group of request target files with the importance level not lower than a designated importance level.

Figure 7:
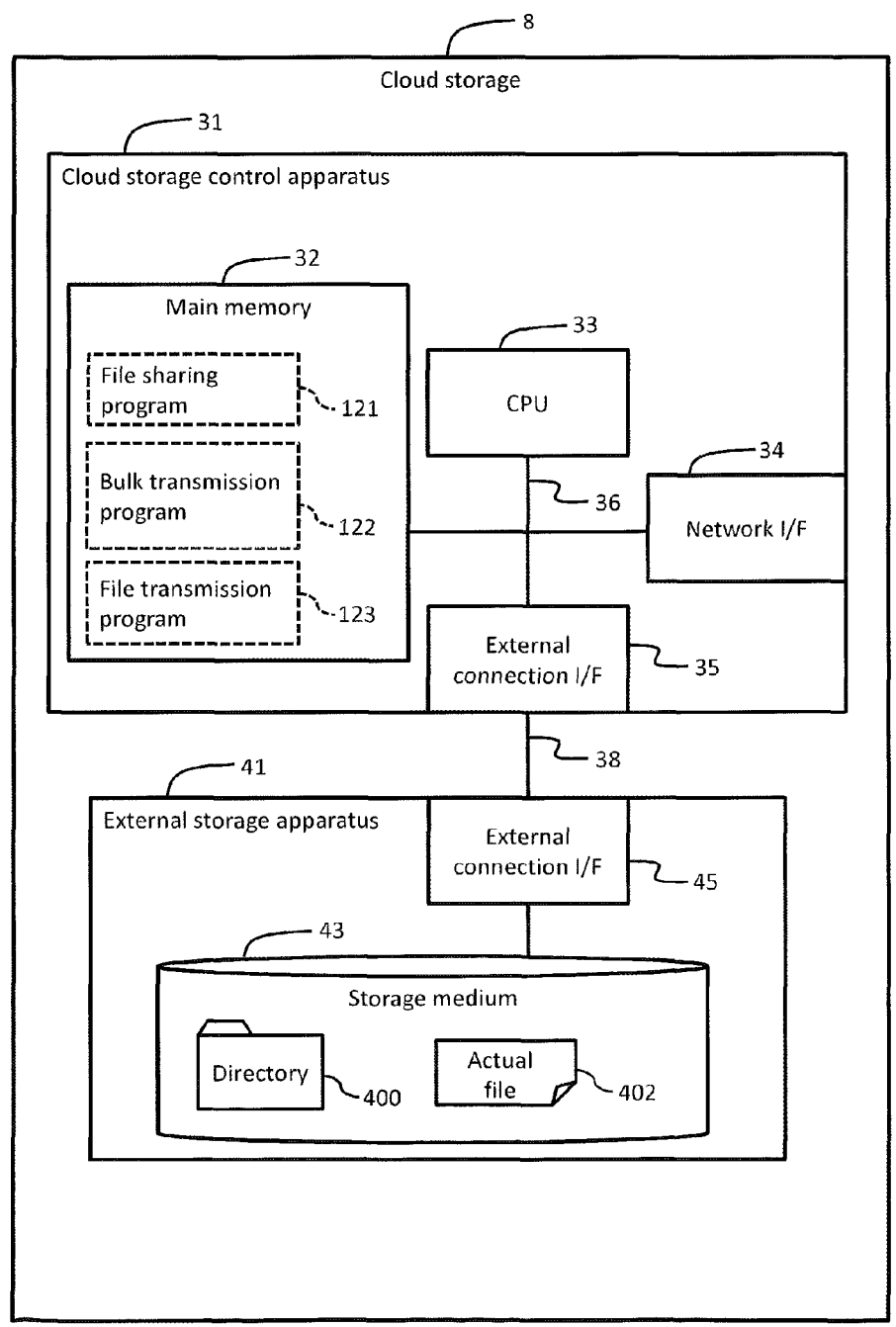
FIG. 7 is a block diagram showing an example of hardware and functions of a cloud storage.

FIG. 7 is a block diagram showing an example of hardware and functions of the cloud storage 8.

The cloud storage 8 includes a cloud storage control apparatus 31 and an external storage apparatus 41. The components 31 and 41 are coupled with each other through a predetermined cable 38 allowing data communications.

The cloud storage control apparatus 31 includes, as hardware, a CPU 33, a main memory 32, a network I/F 34, and an external connection I/F 35. The components 32 to 35 are coupled with each other through a bus 36 allowing bidirectional communications.

The CPU 33, the main memory 32, and the network I/F 34 are as described with the file storage 7. The external connection I/F 35 is an I/F for coupling the cloud storage control apparatus 31 with the external storage apparatus 41.

The cloud storage control apparatus 31 includes, as functions, a file sharing program 121, a bulk transmission program 122, and a file transmission program 123.

The file sharing program 121 is a program for sharing files between the cloud storage 8 and the file storage 7.

The bulk transmission program 122 is a program for executing processing related to the bulk requesting. The bulk transmission program 122 groups actual data pieces corresponding to a plurality of actual files 402 to generate one bulk data, and transmits the bulk data to the file storage 7, in accordance with the bulk request transmitted from the file storage 7. The bulk transmission program 122 may archive (compress) the actual data pieces corresponding to a plurality of actual files 402 to generate one bulk data. The bulk transmission program 122 may encrypt the bulk data.

The file transmission program 123 is a program for executing processing related to file transmission. The file transmission program 123 transmits the actual data corresponding to the actual file 402 to the file storage 7, in accordance with the file request transmitted from the file storage 7.

The external storage apparatus 41 includes an external connection I/F 45 and a storage medium 43. The external connection I/F 45 is an I/F for coupling the external storage apparatus 41 with the cloud storage control apparatus 31. The storage medium 43 stores various types of data such as the directory 400 and the actual file 402, in accordance with the file system. The storage medium 43 may further store the directory metadata 400, the file metadata 420, and the like.

Figure 8:
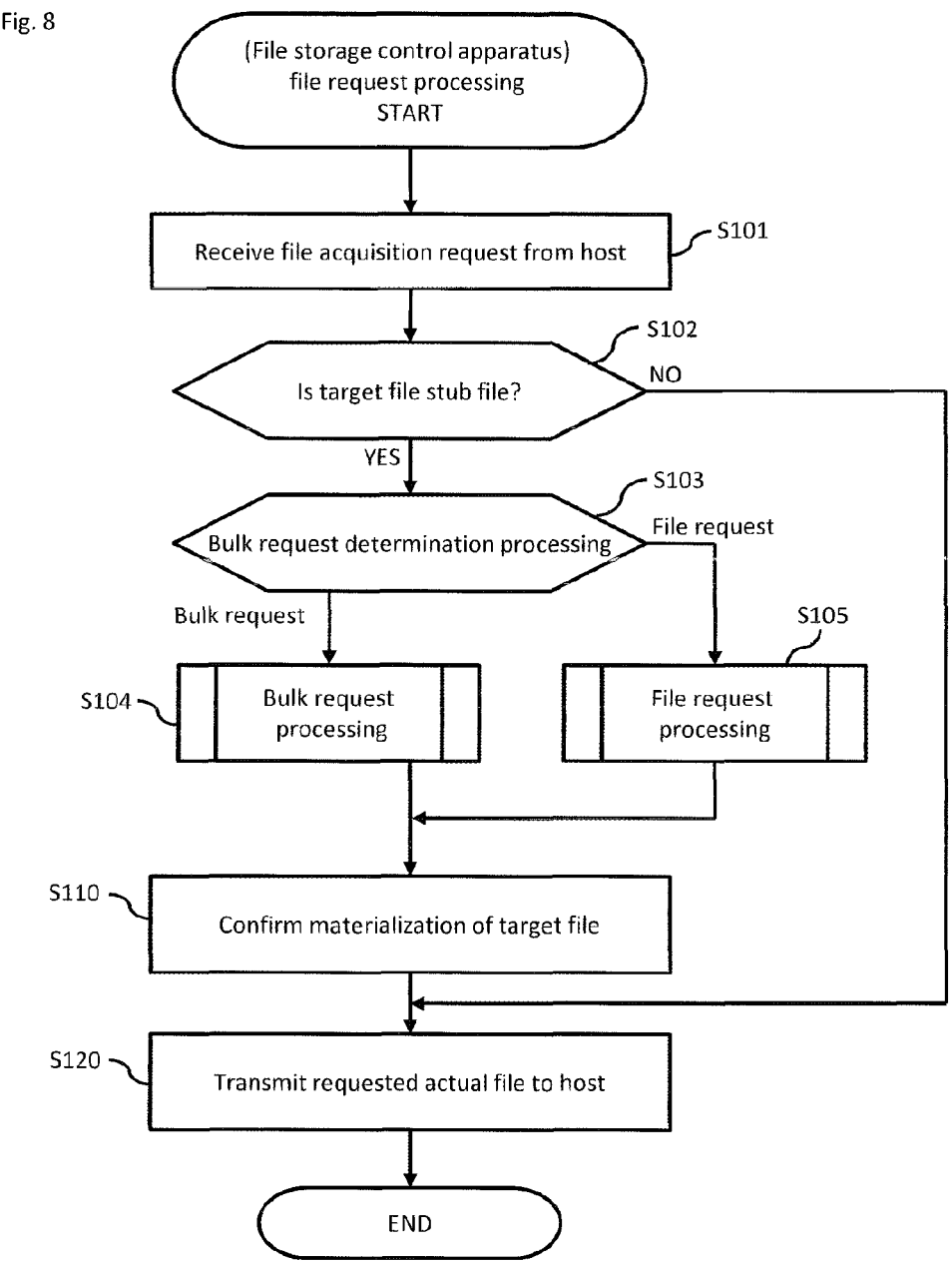
FIG. 8 is a flowchart showing an example of file acquisition processing in the file storage.

FIG. 8 is a flowchart showing an example of file acquisition processing in the file storage 7.

When receiving the file acquisition request from the host 5 (S101), the file storage control apparatus 11 executes the following processing.

The file storage control apparatus 11 (bulk request determination program 103) determines whether the target file corresponding to the file acquisition request is the stub file 201 (S102). If the target file is not the stub file 201 (that is, if the target file is the actual file 202) (S102: NO), the file storage control apparatus 11 transmits the actual file 202 corresponding to the target file to the host 5 (S120), and terminates the processing (END).

If the target file is the stub file 201 (S102: YES), the file storage control apparatus 11 executes "bulk request determination processing" (S103). A method for the determination is described later.

When determining to execute the bulk requesting (S103: bulk request), the file storage control apparatus 11 executes "bulk request processing" (S104), and the processing proceeds to step S110. When determining to execute the file requesting, (S103: file request), the file storage control apparatus 11 executes "file request processing" (S105), and the processing proceeds to step S110. The above-described "bulk request processing" and "file request processing" will be described in detail later. The stub file 201 is materialized through either processing.

The file storage control apparatus 11 (file sharing program 101) waits until the materialization of the stub file 201 is completed. Whether the materialization of the stub file 201 has been completed can be recognized through a completion notification described later. After confirming that the materialization of the stub file 201 has been completed (S110), the file storage control apparatus 11 transmits the actual file 202 corresponding to the file acquisition request to the host 5 (S120), and terminates the processing (END).

Figure 9:
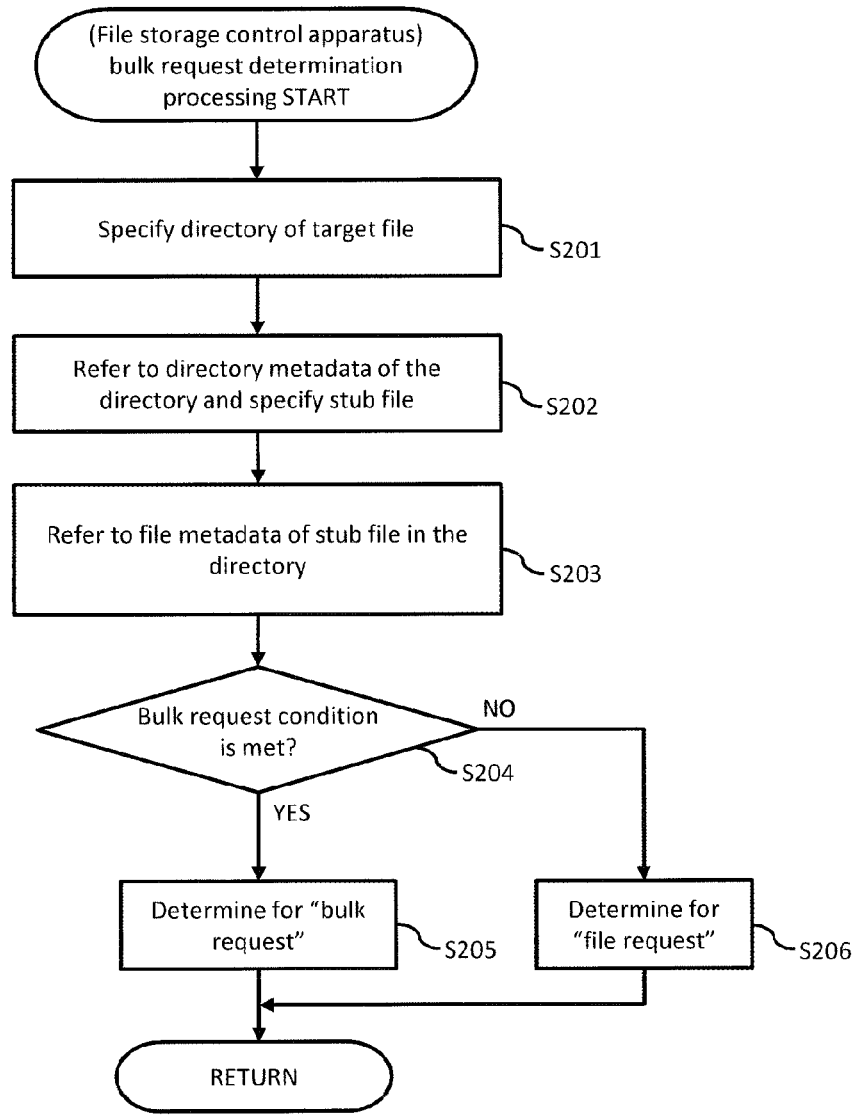
FIG. 9 is a flowchart showing an example of bulk request determination processing.

FIG. 9 is a flowchart showing an example of the bulk request determination processing. The processing corresponds to S103 in FIG. 8.

The file storage control apparatus 11 specifies the directory storing the target file (S201).

The file storage control apparatus 11 refers to the directory metadata 400 of the identified directory 200 to specify the stub file 201 in the specified directory 200 (S202).

The file storage control apparatus 11 refers to the file metadata 420 of the stub file 201 in the specified directory 200 (S203). Here, the file storage control apparatus 11 may determine to execute "file requesting" (S206) if no stub file 201 exists.

The file storage control apparatus 11 determines whether the acquired file metadata 420 satisfies the condition written in the bulk request condition table 440 (S204).

When the condition written in the bulk request condition table 440 is satisfied (S204: YES), the file storage control apparatus 11 determines to execute the bulk requesting (S205), and the processing returns to step S103 (RETURN).

When the condition written in the bulk request condition table 440 is not satisfied (S204: NO), the file storage control apparatus 11 determines to execute the file requesting (S206), and the processing returns to the processing at and after step S103 (RETURN).

Figure 10:
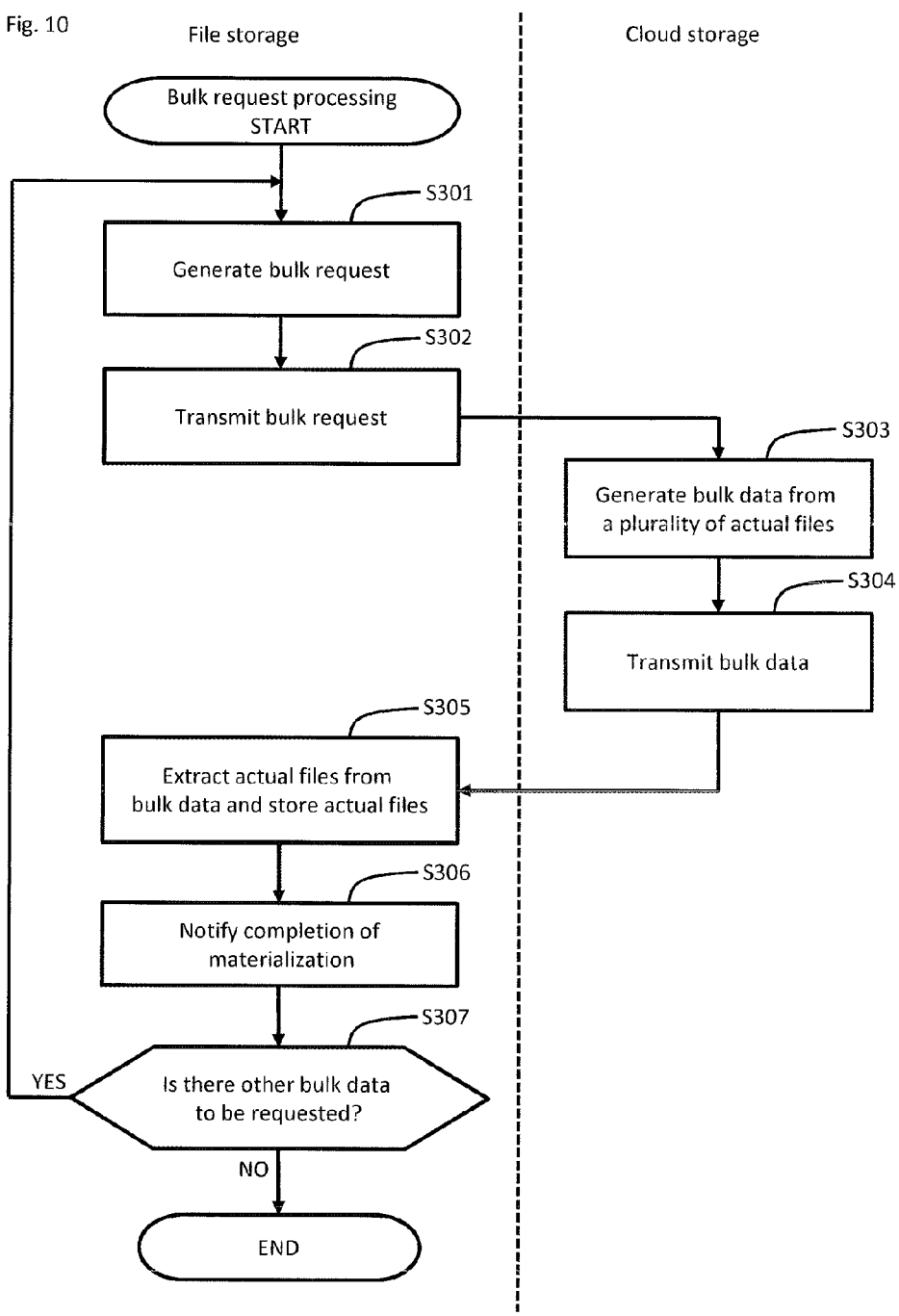
FIG. 10 is a flowchart showing an example of bulk request processing.

FIG. 10 is a flowchart showing an example of the bulk request processing. The processing corresponds to S104 in FIG. 8.

The file storage control apparatus 11 generates the bulk request (S301). The file storage control apparatus 11 then transmits the generated bulk request to the cloud storage 8 (S302).

The cloud storage control apparatus 31 receives the bulk request, and groups a plurality of actual files 402 written in the bulk request to generate one bulk data (S303). Then, the cloud storage control apparatus 31 (bulk request program 122) transmits the generated bulk data to the file storage 7 (S304).

The file storage control apparatus 11 receives the bulk data and extracts the actual files from the bulk data, and stores the actual files in the storage medium 23 (S305). Then, the file storage control apparatus 11 (bulk request determination program 103) notifies the file sharing program 101 of the completion of the materialization (S306).

The file storage control apparatus 11 determines whether there is another bulk data to be requested (S307). If such bulk data exists (S307: YES), the processing returns to step S301, and if no such bulk data exists (S307: NO), the processing is terminated (END). The processing is executed when the bulk requesting is executed with a plurality of actual files grouped into at least two groups, because when the plurality of actual files is grouped into one bulk data, the size is too large to request.

For example, when the total size of target actual files A, B, C, and D is not smaller than a third threshold value, the file storage control apparatus 11 may first transmit the bulk request for the actual files A and B, and then transmit the bulk request for the actual files C and D. Here, when the acquisition request for the file A has been received from the host 5, the file storage control apparatus 11 may include the file A in the first bulk request to shorten the response time for the file A to the host 5. The file storage control apparatus 11 may set the maximum value of the size of the bulk data, and generate and transmit the bulk request in such a manner that each bulk data has a size not larger than the maximum value.

Figure 11:
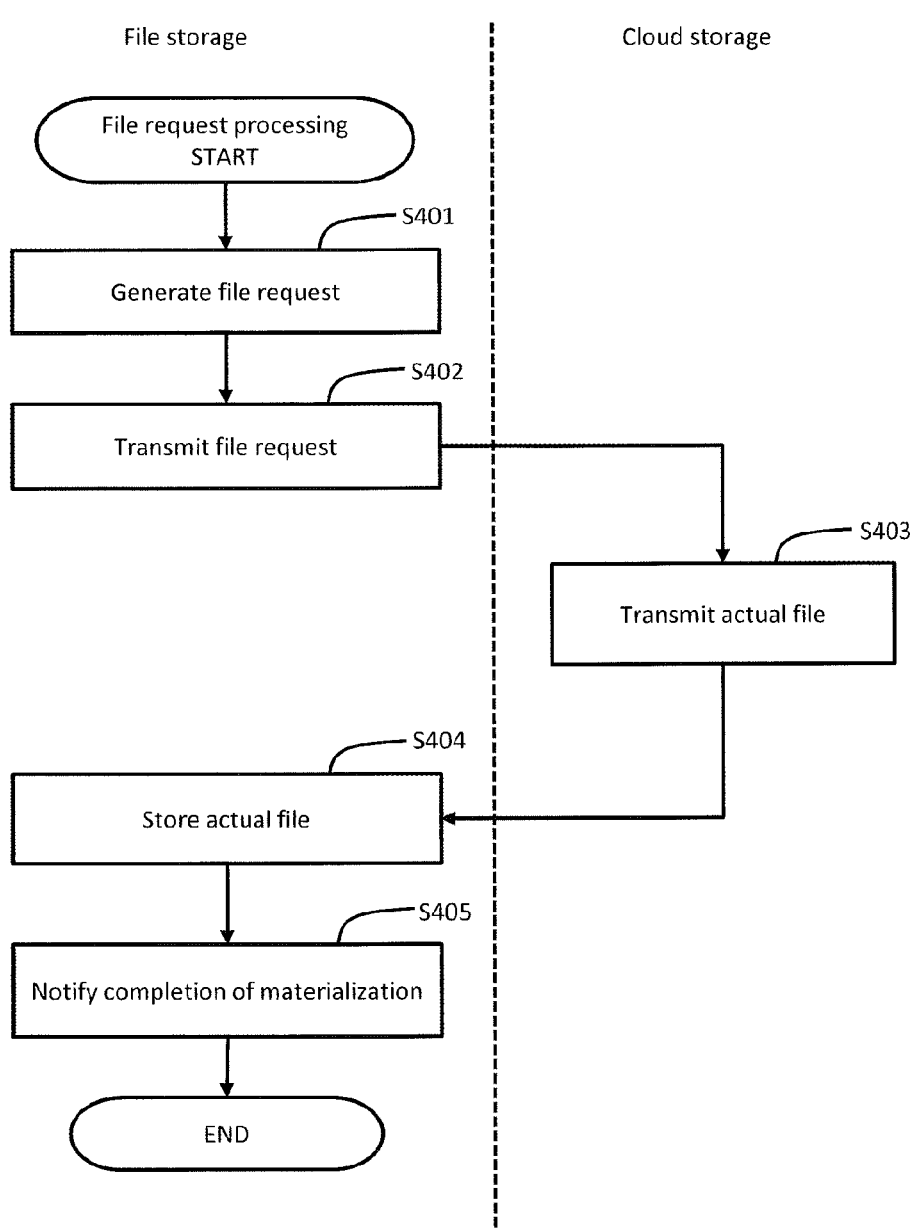
FIG. 11 is a flowchart showing an example of file request processing.

FIG. 11 is a flowchart showing an example of the file request processing. The processing corresponds to S105 in FIG. 8.

The file storage control apparatus 11 generates the file request (S401). Then, the file storage control apparatus 11 transmits the generated file request to the cloud storage 8 (S402).

The cloud storage control apparatus 31 receives the file request, and transmits the actual file 402 corresponding to the file request to the file storage control apparatus 11 on a file basis (S403).

The file storage control apparatus 11 receives the actual file, and stores the actual file in the storage medium 23 (S404). Then, the file storage control apparatus 11 (bulk request determination program 104) notifies the file sharing program 101 of the completion of the materialization (S405), and the processing is completed (END).

Through the processing described above, the file storage 7 can appropriately request the transmission with bulk data or the transmission on a file basis, based on various conditions. Thus, the amount of communications between the file storage 7 and the cloud storage 8 can be reduced. Therefore, when a plurality of stub files 201 are to be restored (materialized), the time required for the restoring (materialization) can be reduced.

Example 2

Figure 12:
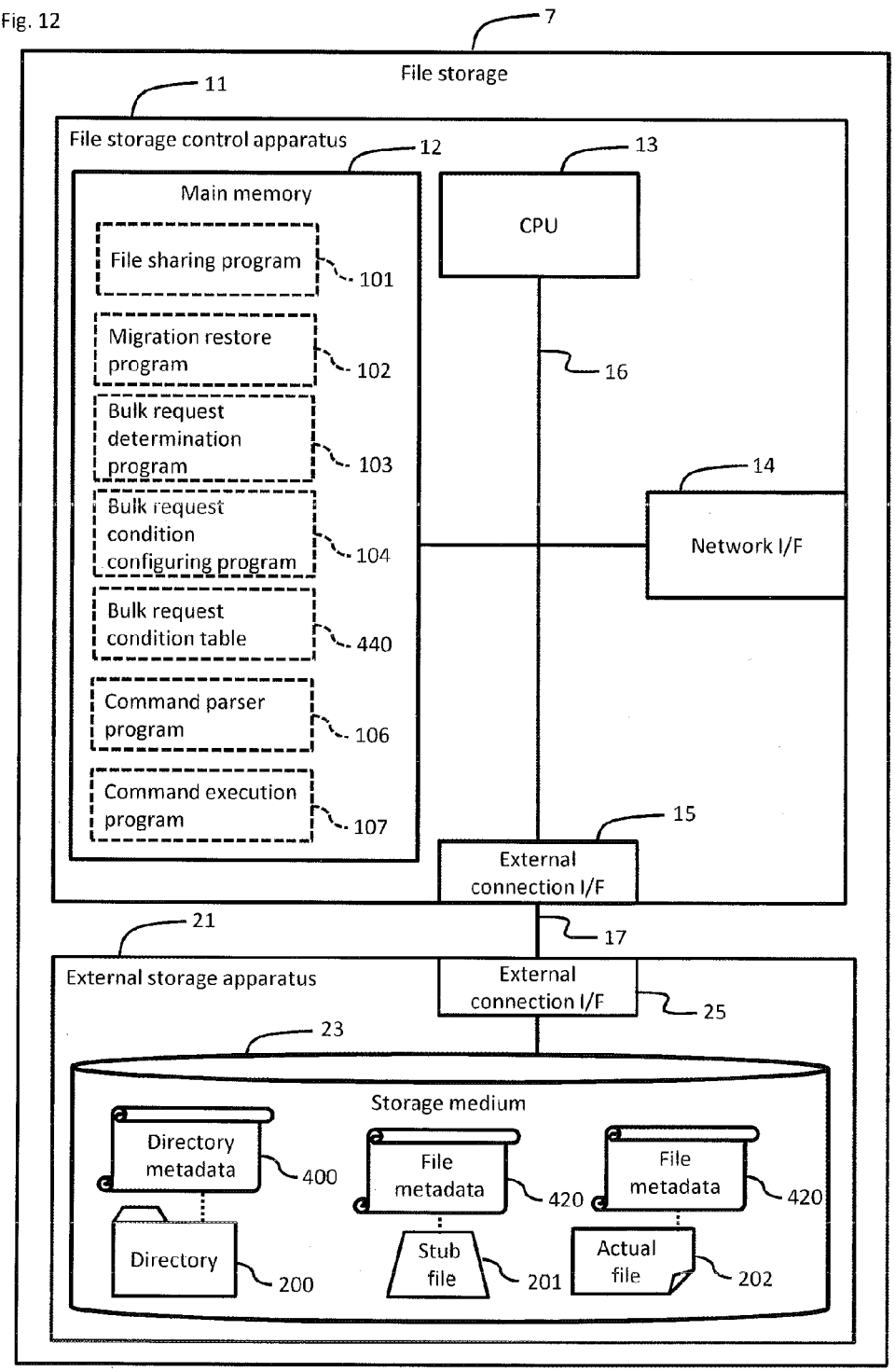
FIG. 12 is an example of functions of a file storage according to a modification.

FIG. 12 shows functions of the file storage 7 according to Example 2.

In the following description, the components that are the same as those in Example 1 are denoted with the same reference numerals and explanation thereof is omitted. An embodiment where a file acquisition request is received from the host 5 is described in Example 1. An embodiment where a command is received from the host 5 is described in Example 2.

The file storage control apparatus 11 includes a command parser program 106 and a command execution program 107, in addition to the functions described in Example 1.

The command parser program 106 is a program that parses (analyzes) a command. For example, the command parser program 106 parses a Linux (registered trademark) command "find /tmp -exec cat { }¥;", and determines to execute "find/tmp", and then execute "cat" with the execution result as an argument.

The command execution program 107 is a program that executes the command analyzed by the command parser program 106. For example, as described above, a case is considered where it is determined that after "find /tmp" is executed by the command parser program 106, "cat" is executed with the execution result as an argument. Here, the command execution program 107 first executes "find". Then, the command execution program 107 executes "cat", with the execution results of "find /tmp" as an argument. Here, "find" is a command for searching a file and a directory. Thus, when "find /tmp" is executed, a file and a directory in a "/tmp" directory are searched. Here, "cat" is a command for displaying the content of a file. All things considered, "find/tmp -exec cat { }¥;" is a command for displaying the contents of all the files in the "/tmp" directory. Thus, when a stub file exists in the "/tmp" directory, the content of the file cannot be executed in "cat" unless the stub file is materialized. In Example 2, a bulk requesting determination in a case where such a command, which cannot be executed unless a stub file is materialized, is requested, is described.

A condition related to a command may be set in the bulk request condition table 440 shown in FIG. 6. For example, a condition that the bulk requesting is executed when any of commands that cannot be executed without an actual file, such as "find (file search command)", "cat (file content display command)", "grep (in-file search command)", or "md5sum (hash check sum calculation command of a file)", is included in a parsed Linux (registered trademark) command, may be set in the bulk request condition table 440.

The bulk request determination program 103 determines to execute the bulk requesting, when the command analyzed by the command parser program 106 satisfies the condition set in the bulk request condition tale 440.

The condition related to a file described in Example 1 and the condition related to the command may both be set in the bulk request condition table 440. For example, a condition that "the bulk requesting is executed when 'the number of files satisfying the condition of "find"≥1000' AND 'average size≤1 MB'" may be set in the bulk request condition tale 440.

Figure 13:
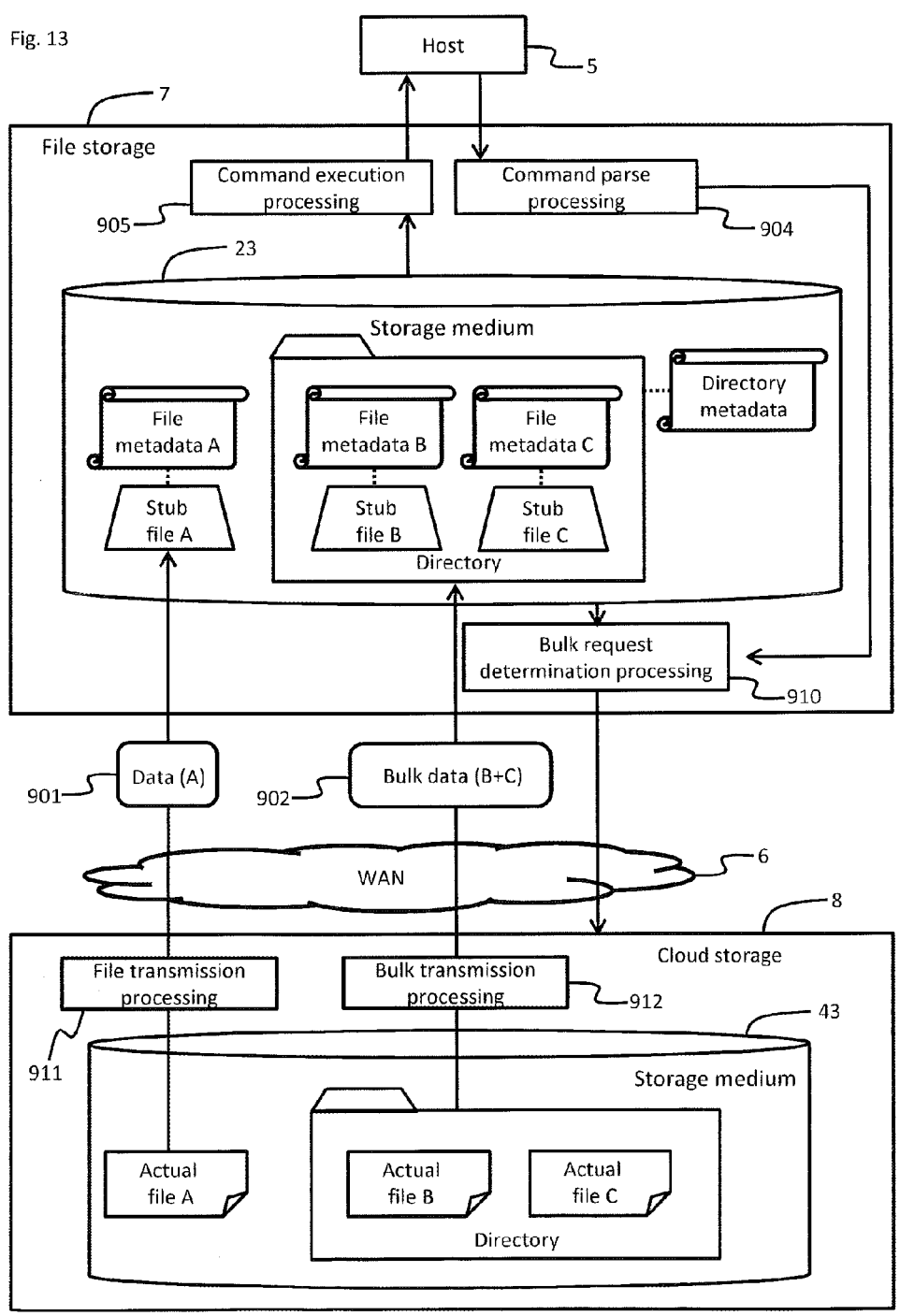
FIG. 13 is a block diagram showing a modification of an overview of processing of a file storage and a cloud storage.

FIG. 13 is a block diagram showing an overview of processing of a storage system according to Example 2.

The command parser program 106 of the file storage 7 executes parse processing on a command received from the host 5 (905). The bulk request determination program 103 determines whether to execute "file requesting" or "bulk requesting" for an actual file corresponding to a stub file, based on whether the parsed command satisfies the condition registered in the bulk request condition table 440 (910).

For example, when the command "find /tmp -exec cat { }¥;" is transmitted from the host 5, the command parser program 106 parses the command. The bulk request determination program 103 specifies a file corresponding to "find /tmp" based on the parse result of the command and the condition in the bulk request condition table 440. Then, the bulk request determination program 103 specifies a stub file from the specified file. Then, the bulk request determination program 103 determines whether to execute "bulk requesting" or "file requesting" for the stub file. For example, when the stub files B and C (at least two stub files) are stored in "/tmp", the bulk request determination program 103 determines to execute the bulk requesting for the actual files B and C corresponding to the stub files B and C. As a result, the file storage 7 receives the actual files B and C as the bulk data from the cloud storage 8, and materializes the stub files B and C. The command execution program 107 executes the command "find /tmp -exec cat { }¥;" for the actual files B and C.

By thus transmitting the actual files B and C as the bulk data, the amount of communications between the file storage 7 and the cloud storage 8 can be reduced from that in a case where the actual files B and C are transmitted on a single file basis. This is because when data is transmitted on a file basis, data such as a header is added to each file to be transmitted, thereby increasing the data amount, as in Example 1. The data amount increases especially when the file size is small.

The embodiments described above are merely examples for describing the present invention, and there is no intension to limit the scope of the present invention to the embodiments. A person skilled in the art can implement the present invention in various ways without departing from the gist of the present invention.

For example, when the host 5 issues an acquisition request for an actual file and a plurality of stub files exist in a directory storing the actual file, the file storage control apparatus 11 may execute the bulk request for the stub files. Specifically, the file storage control apparatus 11 determines that the host 5 is likely to access another file in the directory to which the host 5 has issued the acquisition request for the actual file, and may materialize the stub file in the directory beforehand.

REFERENCE SIGNS LIST

5 Host
7 File storage
8 Cloud storage

The invention claimed is:

1. A storage system comprising:
a first storage apparatus; and
a second storage apparatus coupled to the first storage apparatus, wherein
the first storage apparatus is configured to
execute bulk request determination of determining whether to execute bulk requesting of causing the second storage apparatus to group a plurality of actual files corresponding to a plurality of stub files into one bulk data and transmit the bulk data,
transmit a bulk request to the second storage apparatus when determining to execute the bulk requesting in the bulk request determination, and
extract the plurality of actual files corresponding to the plurality of stub files, from the bulk data received from the second storage apparatus, and
the second storage apparatus is configured to group the plurality of actual files corresponding to the plurality of stub files into the one bulk data and transmit the bulk data to the first storage apparatus, based on the bulk request, when the bulk request is received from the first storage apparatus.

2. The storage system according to claim 1, wherein the first storage apparatus is configured to determine to execute, in the bulk request determination, when a first condition that a plurality of stub files not less than a first threshold value are stored in a directory storing a target file requested by a host is satisfied, the bulk requesting for the plurality of stub files stored in the directory.

3. The storage system according to claim 2, wherein the first storage apparatus is configured to determine to execute the bulk request for the plurality of stub files in the bulk request determination, when the first condition is satisfied and when a second condition that an average size of a plurality of actual files corresponding to the plurality of stub files is not larger than a second threshold value is satisfied.

4. The storage system according to claim 2, wherein the first storage apparatus is configured to transmit to the second storage apparatus, when the bulk requesting is determined to be executed in the bulk request determination and when a third condition that a total size of a plurality of actual files as a target of the bulk requesting is not less than a third threshold value is satisfied, a bulk request for each of at leant two groups of the plurality of actual files as the target of the bulk requesting.

5. The storage system according to claim 4, wherein the first storage apparatus is configured to include a request for a stub file corresponding to a target file requested by the host, in a first bulk request to be transmitted, when the third condition is satisfied.

6. The storage system according to claim 1, wherein the first storage apparatus is configured to execute the bulk request determination when a processing target of a command received from a host includes the stub file, and to not execute the bulk request determination when the processing target of the command does not include the stub file.

7. The storage system according to claim 6, wherein the first storage apparatus is configured to determine to execute in the bulk request determination, when the processing target of the command includes a plurality of actual files, the bulk requesting for a plurality of actual files corresponding to the plurality of stub files as the processing target of the command.

8. The storage system according to claim 7, wherein the first storage apparatus is configured to transmit to the second storage apparatus, when the bulk requesting is determined to be executed in the bulk request determination and when a total size of a plurality of actual files as a target of the bulk requesting is not less than a third threshold value is satisfied, a bulk request for each of at least two groups of the plurality of actual files as the target of the bulk requesting.

9. A storage method comprising:
operating a first storage apparatus to execute bulk request determination of determining whether to execute bulk requesting of causing the second storage apparatus to group a plurality of actual files corresponding to a plurality of stub files into one bulk data, and, when determination is made that the bulk requesting is executed, transmit the bulk request to a second file storage apparatus coupled to the first storage apparatus;
operating the second storage apparatus to group the plurality of actual files corresponding to the plurality of stub files into the one bulk data based on the bulk request, when the bulk request is received from the first storage apparatus, and transmit the bulk data; and
operating the first storage apparatus to extract the plurality of actual files corresponding to the plurality of stub files, from the bulk data received from the second storage apparatus, when the bulk data is received from the second storage apparatus.

* * * * *